US008719276B1

(12) United States Patent
Haahr et al.

(10) Patent No.: US 8,719,276 B1
(45) Date of Patent: May 6, 2014

(54) RANKING NODES IN A LINKED DATABASE BASED ON NODE INDEPENDENCE

(75) Inventors: Paul Haahr, San Francisco, CA (US); Martin Kaszkiel, Santa Clara, CA (US); Amit Singhal, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 5 days.

(21) Appl. No.: 12/984,439

(22) Filed: Jan. 4, 2011

Related U.S. Application Data

(63) Continuation of application No. 12/507,564, filed on Jul. 22, 2009, now abandoned, which is a continuation of application No. 10/813,607, filed on Mar. 31, 2004, now abandoned.

(60) Provisional application No. 60/519,271, filed on Nov. 13, 2003.

(51) Int. Cl.
*G06F 7/00* (2006.01)
*G06F 17/30* (2006.01)

(52) U.S. Cl.
USPC ........... 707/748; 707/723; 707/803; 715/206; 715/208

(58) Field of Classification Search
USPC .......................................... 707/748; 715/206
See application file for complete search history.

(56) References Cited

U.S. PATENT DOCUMENTS

| 5,765,150 | A | | 6/1998 | Burrows |
| 6,112,203 | A | * | 8/2000 | Bharat et al. ...................... 707/5 |
| 6,285,999 | B1 | | 9/2001 | Page |
| 6,334,131 | B2 | * | 12/2001 | Chakrabarti et al. ........... 707/10 |
| 6,601,075 | B1 | | 7/2003 | Huang et al. |
| 6,754,873 | B1 | * | 6/2004 | Law et al. ...................... 715/208 |
| 7,028,026 | B1 | | 4/2006 | Yang et al. |
| 7,058,628 | B1 | | 6/2006 | Page |
| 7,117,206 | B1 | | 10/2006 | Bharat et al. |
| 7,398,271 | B1 | * | 7/2008 | Borkovsky et al. ............... 707/7 |
| 7,464,076 | B2 | * | 12/2008 | Eiron et al. ...................... 707/3 |
| 2004/0193698 | A1 | | 9/2004 | Lakshminarayana |
| 2006/0149757 | A1 | | 7/2006 | Bird et al. |
| 2007/0118521 | A1 | | 5/2007 | Jatowt et al. |

OTHER PUBLICATIONS

Chakrabarti et al, 'Focused Crawling: A New Approach to Topic Specific Web Resource Discovery', 1999, Elsevier Science B.V., pp. 1623-1640.*
Gifford, 'Weighted Voting for Replicated Data', 1979, In Proceedings of the seventh ACM symposium on Operating systems principles (SOSP '79). ACM, pp. 150-162.*
Rodrig et al, 'Decentralized Weighted Voting for P2P Data Management', May 2003, Intel Research Seattle, pp. 1-10.*
Co-pending U.S. Appl. No. 12/507,564, filed Jul. 22, 2009 entitled "Ranking Nodes in a Linked Database Based on Node Independence" by Paul Haahr et al., 38 pages.

(Continued)

*Primary Examiner* — Ajay Bhatia
*Assistant Examiner* — Cheryl M Shechtman
(74) *Attorney, Agent, or Firm* — Harrity & Harrity, LLP (57) ABSTRACT

A system includes a ranking component that ranks nodes, such as web sites, to obtain ranking values that define a quality judgment of the nodes. The ranking values are based on links between the nodes and, among other things, deemphasize links between affiliated nodes. Additionally, the amount of rank that any particular node can contribute to another node may be capped at a threshold level, thus tending to prevent some nodes from unduly influencing the ranking values.

24 Claims, 8 Drawing Sheets

(56) References Cited

OTHER PUBLICATIONS

L. Page et al., "The PageRank citation ranking: Bringing order to the Web", submitted for publication, http://citeseer.ist.psu.edu/page98pagerank.html, pp. 1-17.

Y. Li, "Toward a Qualitative Search Engine," Jul.-Aug. 1998, IEEE Internet Computing publication, pp. 24-29.

Brin et al., "The anatomy of a large scale hypertextual web search engine," WWW7 conference, 1998, pp. 1-18.

Haveliwala, "Topic-Sensitive Page Rank," WWW conference, May 7-11, 2002, pp. 1-10.

* cited by examiner

RANKING NODES IN A LINKED DATABASE BASED ON NODE INDEPENDENCE

RELATED APPLICATION

This application is a continuation of U.S. patent application Ser. No. 12/507,564, filed Jul. 22, 2009, now abandoned, which is a continuation of U.S. patent application Ser. No. 10/813,607, filed Mar. 31, 2004, now abandoned, which claims priority under 35 U.S.C. §119(e) based on U.S. Provisional Application Ser. No. 60/519,271, filed Nov. 13, 2003, the disclosures of which are incorporated herein by reference.

BACKGROUND OF THE INVENTION

A. Field of the Invention

The present invention relates generally to information retrieval and, more particularly, to assigning ranking values to a set of linked nodes.

B. Description of Related Art

The World Wide Web ("web") contains a vast amount of information. Search engines assist users in locating desired portions of this information by cataloging web pages. Typically, in response to a user's request, the search engine returns references to documents relevant to the request.

Search engines may base their determination of the user's interest on search terms (called a search query) entered by the user. The goal of the search engine is to identify links to high quality relevant results based on the search query. Typically, the search engine accomplishes this by matching the terms in the search query to a corpus of pre-stored web documents. Web documents that contain the user's search terms are considered "hits" and are returned to the user.

The hits returned by the search engine are typically sorted based on relevance to the user's search terms. Determining the correct relevance, or importance, of a web page to a user, however, can be a difficult task. For one thing, the relevance of a web page to the user is inherently subjective and depends on the user's interests, knowledge, and attitudes. There is, however, much that can be determined objectively about the relative importance or quality of a web page. Existing methods of determining relevance are based on matching a user's search terms to terms indexed from web pages. More advanced techniques determine the importance of a web page based on more than the content of the web page. For example, one prior method, called PageRank™, assigns a degree of importance to a web page based on the link structure of the web. An implementation of PageRank™ is described in U.S. Pat. No. 6,285,999, the contents of which are incorporated by reference herein.

Web pages that are ranked highly by a ranking technique such as PageRank™ tend to be presented more prominently to the end-user than lower ranked web pages. Accordingly, higher ranking web pages tend to have higher selection ("click-through") rates than web pages with lower rankings. Since many web sites would like to increase traffic, higher rankings are desirable.

Some entities, such as certain on-line commercial interests, may attempt to artificially improve their ranking in order to get higher user traffic. In the case of the PageRank™ ranking system, for example, which is based on links between pages, the owners or creators of some web sites may, based on their knowledge of the PageRank™ algorithm, attempt to optimize their link structure to improve their PageRank™ rating. Another method of artificially boosting a PageRank™ ranking is based on paying another site, with high rank, to link to the web site. In general, any artificial attempts to improve the ranking of a web site by "tuning" the web site to a specific ranking algorithm does not improve the user-perceived quality of the web site and may thus decrease the overall performance of the search engine.

Thus, there is a need in the art for ranking techniques that deemphasize artificial attempts to boost the ranking of a web site.

SUMMARY OF THE INVENTION

One aspect of the invention is directed to a method including identifying a plurality of linked nodes and assigning ranking values to the linked nodes based on the links between the nodes. The ranking values are assigned such that a first one of the linked nodes that was previously assigned a relatively low ranking value contributes to the assigned ranking values an amount based on the previously assigned ranking value diluted by a first amount, and a second one of the linked nodes that was previously assigned a relatively high ranking value contributes to the assigned ranking values an amount based on the previously assigned ranking value and diluted by a second amount.

Another aspect of the invention includes identifying a plurality of linked nodes and assigning ranking values to the linked nodes based on the links between the nodes. The ranking values are assigned such that a first one of the linked nodes that was previously assigned a first ranking value contributes to the assigned ranking values a first amount based on the previously assigned first ranking value and a second one of the linked nodes that was previously assigned a second ranking value contributes to the assigned ranking values a second amount based on the previously assigned second ranking value. The first and second amounts are adjusted based on a relative value of the first ranking value and second ranking value, respectively, compared to a predetermined value.

Another aspect of the invention is directed to a method that includes identifying a plurality of linked nodes, identifying clusters of affiliated nodes, and assigning ranking values to a first node in a first cluster of affiliated nodes based on the ranking values of linking nodes that link to the first node, wherein an amount of rank assigned to the first node based on the ranking value of a first linking node in the first cluster is reduced based on a number of affiliated nodes in the first cluster.

Yet another aspect of the invention includes identifying a plurality of linked nodes, identifying clusters of affiliated nodes, and assigning ranking values to a first node based on the ranking values of linking nodes that link to the first node, wherein an amount of rank assigned based on the ranking values of linking nodes is reduced when the linking nodes are in a same cluster and wherein the amount of rank assigned based on the linking nodes that are in a same cluster is reduced by contributing an amount of rank to the first node based on a maximum ranking value of the linking nodes in the same cluster.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

As described herein, a ranking component ranks nodes, such as web sites, to obtain a ranking value that defines a quality judgment of the nodes. The ranking is based on links between the nodes and, among other things, deemphasizes links between affiliated nodes.

Exemplary Network Overview

Figure 1:
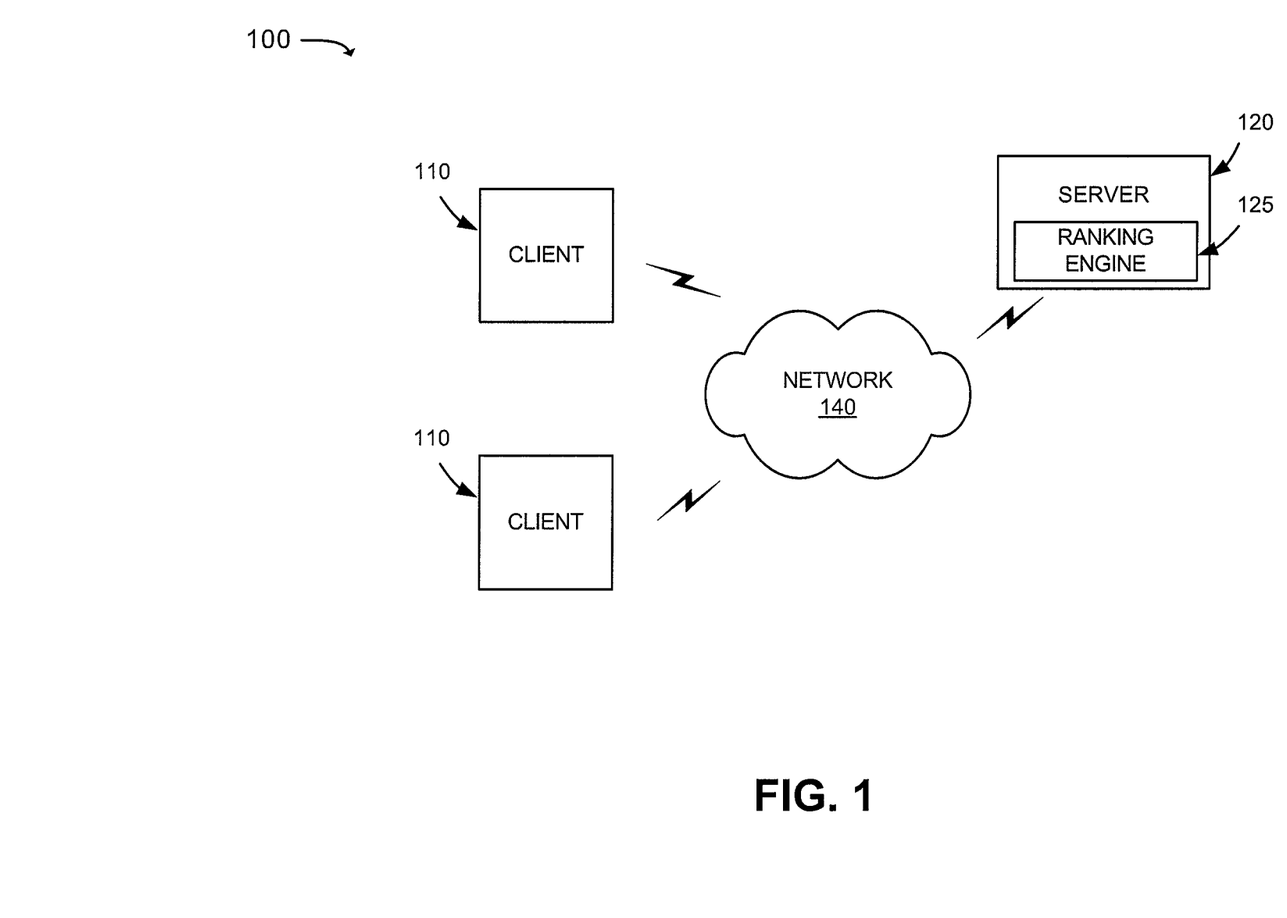
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to one or more servers 120 via a network 140. Network 140 may include a local area network (LAN), a wide area network (WAN), a telephone network, such as the Public Switched Telephone Network (PSTN), an intranet, the Internet, or a combination of networks. Two clients 110 and one server 120 have been illustrated as connected to network 140 for simplicity. In practice, there may be more clients and/or servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Server 120 may include server entities that process, search, and/or maintain documents in a manner consistent with the principles of the invention. Clients 110 and server 120 may connect to network 140 via wired, wireless, or optical connections.

In an implementation consistent with the principles of the invention, server 120 may include a ranking engine 125. In general, ranking engine 125 may calculate ranking values that refine an objective measure of quality of resources, such as web sites coupled to network 140.

A document, as the term is used herein, is to be broadly interpreted to include any machine-readable and machine-storable work product. A document may be an e-mail, a file, a combination of files, one or more files with embedded links to other files, a news group posting, etc. In the context of the Internet, a common document is a web page. Web pages often include content and may include embedded information (such as meta information, hyperlinks, etc.) and/or embedded instructions (such as Javascript, etc.).

A node, as used herein, may refer to one or more documents. In particular, in the context of the Internet, a node may refer to a web site, each of which may contain one or more web pages. Other definitions of a node are possible. For example, if the corpus of documents were research papers, a node may be defined as the set of documents written by a particular author.

Exemplary Client/Server Architecture

Figure 2:
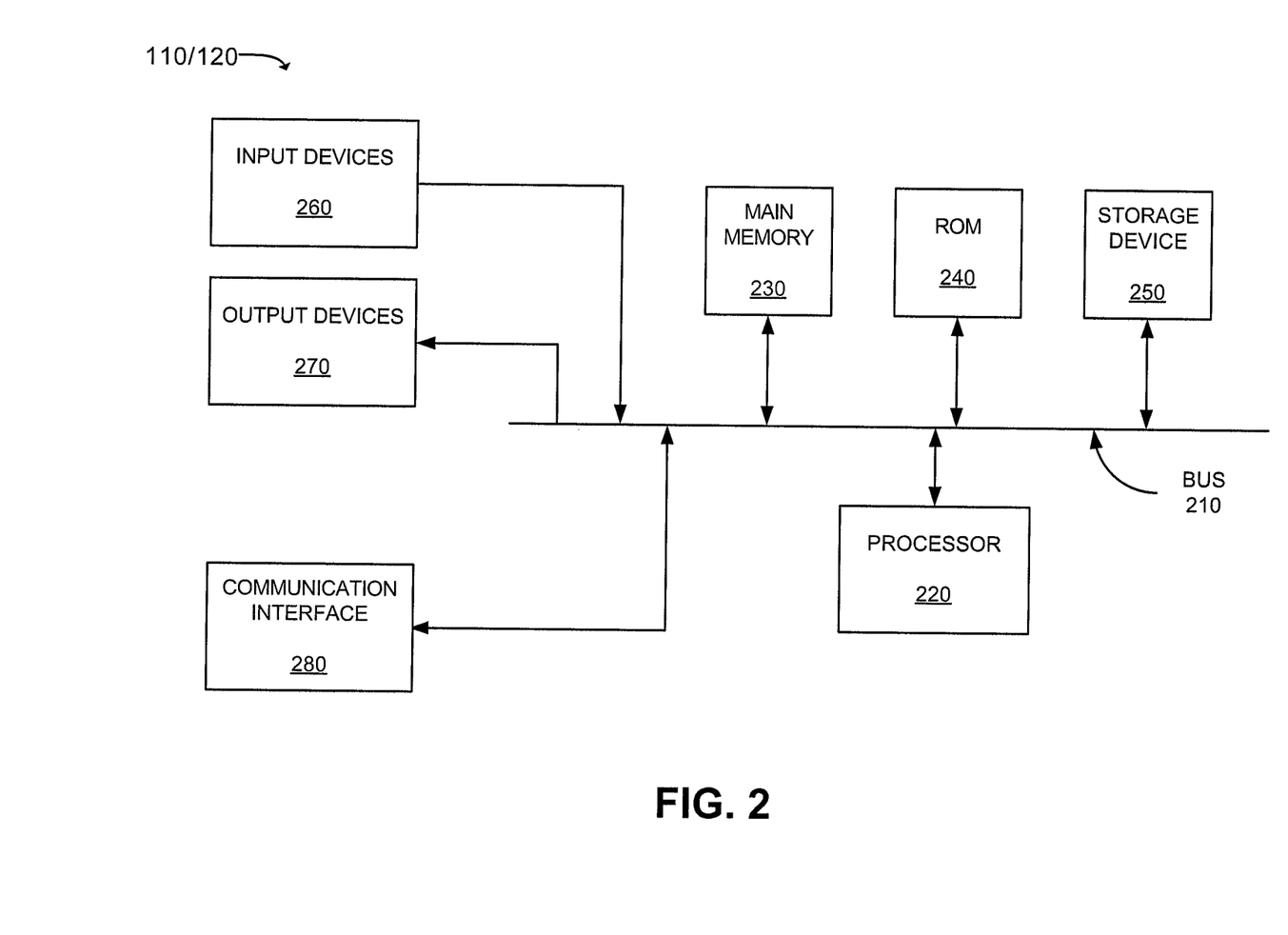
FIG. 2 is an exemplary diagram of a client or server according to an implementation consistent with the principles of the invention.

FIG. 2 is an exemplary diagram of a client 110 or server 120 according to an implementation consistent with the principles of the invention. Client/server 110/120 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of client/server 110/120.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit a user to input information to client/server 110/120, such as a keyboard, a mouse, a pen, voice recognition and/or biometric mechanisms, etc. Output device(s) 270 may include one or more conventional mechanisms that output information to the user, including a display, a printer, a speaker, etc. Communication interface 280 may include any transceiver-like mechanism that enables client/server 110/120 to communicate with other devices and/or systems. For example, communication interface 280 may include mechanisms for communicating with another device or system via a network, such as network 140.

As will be described in detail below, server 120, consistent with the principles of the invention, performs certain document ranking related operations through ranking engine 125. Ranking engine 125 may be stored in a computer-readable medium, such as memory 230. A computer-readable medium may be defined as one or more physical or logical memory devices and/or carrier waves.

The software instructions defining ranking engine 125 may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Ranking Engine

Figure 3:
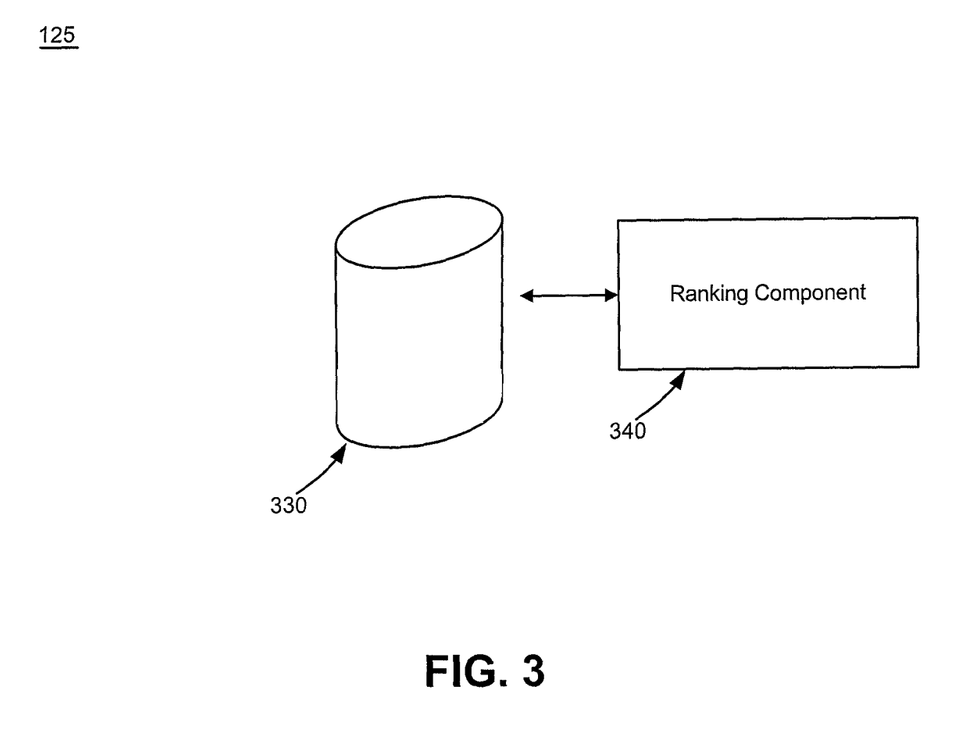
FIG. 3 is a block diagram illustrating an implementation of an exemplary search engine.

FIG. 3 is a block diagram illustrating an implementation of ranking engine 125 in additional detail. Ranking engine 125 may include a ranking component 340. The documents on which ranking component 340 operates may be stored in a database 330. Database 330 may be implemented in many different forms, such as a distributed database, a relational database, and so on. In one implementation, database 330 is generated from web documents downloaded from the world wide web.

Ranking component 330 may assign a ranking value (also called simply a "rank" herein) to the documents in database 330. Consistent with aspects of the invention, the rank is a value that attempts to quantify the quality of the documents. The rank is based on links, such as hyperlinks, that connect the nodes in the collection of documents in database 330.

Figure 4:
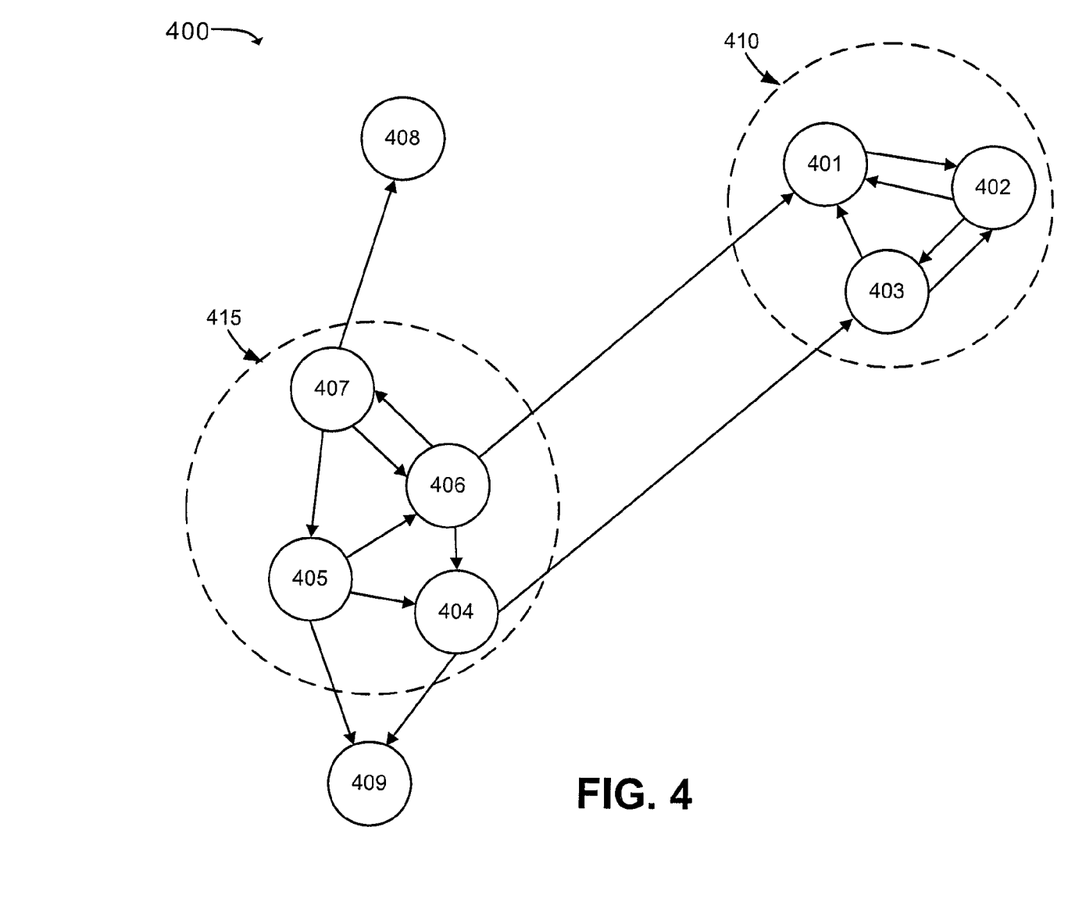
FIG. 4 is a network graph of nodes, such as web sites, indexed by the search engine shown in FIG. 1.

FIG. 4 is a diagram illustrating an exemplary set of nodes 400 indexed by search engine 125. As previously mentioned, a node may refer to a set of documents such as a web site. The documents indexed by database 330 may be pre-classified into nodes. In practice, the set of nodes 400 would generally be much larger than the set illustrated in FIG. 4. For example, database 330 may include many billions of documents, which may define millions of nodes. For ease of explanation, however, only nine nodes, labeled as nodes 401-409, are shown as being included in the set of nodes 400.

The nodes in set 400 can be thought of as forming a network graph in which the nodes are connected by their links. When nodes 400 represent web pages, the links may be in the form of hyperlinks. In FIG. 4, lines with arrows are used to indicate links. A line originating from a first node and leading to a second node may be called a forward or outbound link relative to the first node and indicate that the first node is a linking node. Conversely, a line originating from the second node and leading to the first node may be called a backward or inbound link relative to the first node and indicate that the first node is a linked to node. Node 401, for example, has a single outbound link leading to node 402 and three inbound links originating from nodes 402, 403, and 406.

Ranking component 340 may determine that certain nodes in set 400 are somehow affiliated with one another. In FIG. 4, clusters of affiliated nodes are shown as enclosed in dashed circles 410 and 415. Ranking component 340 may generally determine nodes to be included in an affiliated cluster when it determines the nodes to have related or shared organizational control, or otherwise do not appear independent. In other words, ranking component 340 may determine that multiple nodes should be clustered when there is a high probability that all of the nodes are controlled by a single entity. Ranking component 340 may automatically classify nodes into clusters based on one or more of a number of possible factors. For example, the determination of affiliation can be based on node graph structure, similarity of node content (e.g., text or structure), ownership records, manually entered information, or other factors.

One implementation for determining affiliated nodes may be based simply on common ownership information as given by a WHOIS search.

Operation of Ranking Component

Figure 5:
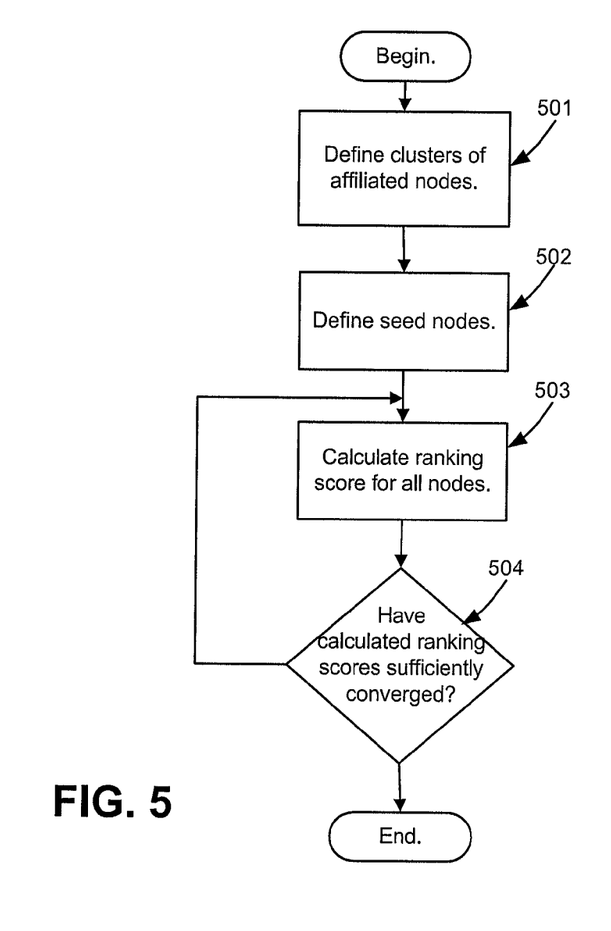
FIG. 5 is a diagram illustrating operation of a ranking component consistent with aspects of the invention for defining ranking values for nodes in a set of nodes.

FIG. 5 is a diagram illustrating operation of ranking component 340 consistent with aspects of the invention for defining rank values for nodes in a set of nodes, such as set 400.

In general, ranking component 340 determines ranks based on the link structure of nodes in the network graph. Links between nodes in an affiliated cluster of nodes are deemphasized. Additionally, some nodes may be designated or are determined to be "authority nodes," which allow them to contribute a predetermined maximum amount of rank to nodes to which the authority nodes link.

Beginning with a set of nodes (e.g., set 400), ranking component 340 may define clusters of affiliated nodes (act 501). The clusters may be automatically defined as previously discussed with reference to FIG. 4. Ranking component may then receive an identification of one or more "seed nodes" in the set of nodes 400 (act 502). The seed nodes are nodes that are known to be high quality nodes. In the context of web sites, the seed nodes may be web sites that are known to be quality web sites, such as a popular web site that provides an objective directory relating to a certain subject in which there is no attempt to artificially inflate rank. The seed nodes may be determined manually by an operator and may be assigned an initial rank.

Once one or more of the nodes in set 400 have been identified as seed nodes and assigned a rank, ranking component 340 calculates the ranks for all nodes 401-409 (act 503). The specific technique used to calculate the ranks is described in more detail below. In general, the technique is an iterative one that is based on links between nodes 401-409. That is, each pass in calculating the ranks may change the ranks from the previous pass. Ranking component 340 may continue to repeat the calculation of the ranks in act 503 until the ranks have sufficiently converged (act 504). "Sufficiently converged" can be determined when the ranks generally stop changing, within a certain error tolerance, from one pass to the next. Ranks for typical graphs converge within 100 iterations.

Before describing the calculation of the ranks (act 503) in additional detail, several terms that are used in describing the calculation of the ranks in one embodiment of the invention will first be defined.

The rank for a given node is calculated based on the nodes that link to the given node. More particularly, each node that links to the given node casts a "vote" for the given node. A node that casts a vote may be called a "voting node." The weight assigned to each vote varies based on the rank of the voting node. Generally, a vote from a node with a high rank counts more than a vote from a node with a low rank.

A "full vote" is defined to be the maximum vote value that one node can give to another. For example, in one implementation, a full vote value may be assigned the value of 1.0, although this is an arbitrary number and other numbers could of course be used.

A "trusted authority" is a node that is able to give a full vote to all of the nodes to which it links. The "trusted authority threshold" is the rank at which a node becomes a trusted authority. A possible value for this threshold, when a full vote is given the value of 1.0, is 1000.

The "damping factor" and the "authority decay exponent" are additional parameters used in calculating the ranks. The damping factor generally operates to reduce a propagated rank to prevent cycles in the network graph from becoming sources of infinite rank. The damping factor may be a value in the range 0.5 to 0.99 that is multiplied by the vote value of the non-trusted authority voting nodes. The authority decay exponent is a constant used to control how much like a trusted authority a node is in its ability to bestow rank. An exemplary value of the authority decay exponent is 3.0. Nodes with ranks very close to the authority threshold can contribute near full votes while those with lower ranks can only contribute a fraction of their rank as votes. The authority decay exponent helps to determine the fraction to use in reducing the vote of non-trusted authority nodes.

Figure 6A:
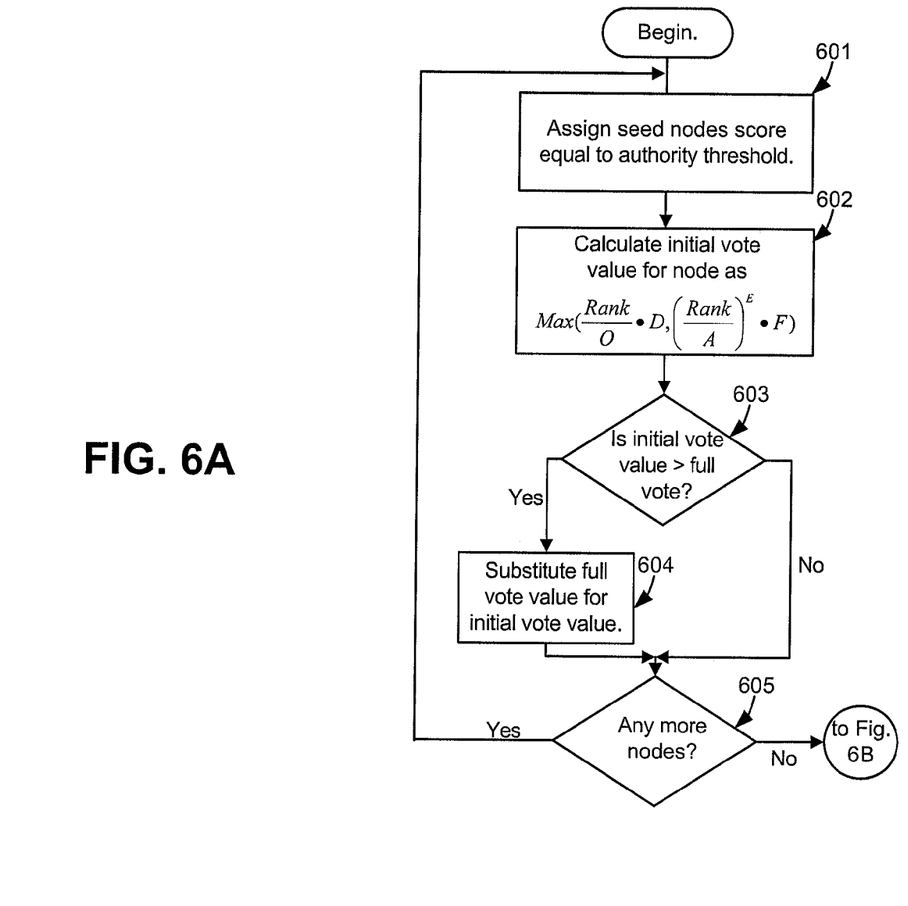
FIGS. 6A and 6B are flow charts illustrating the calculation of the ranking values in additional detail.
Figure 6B:
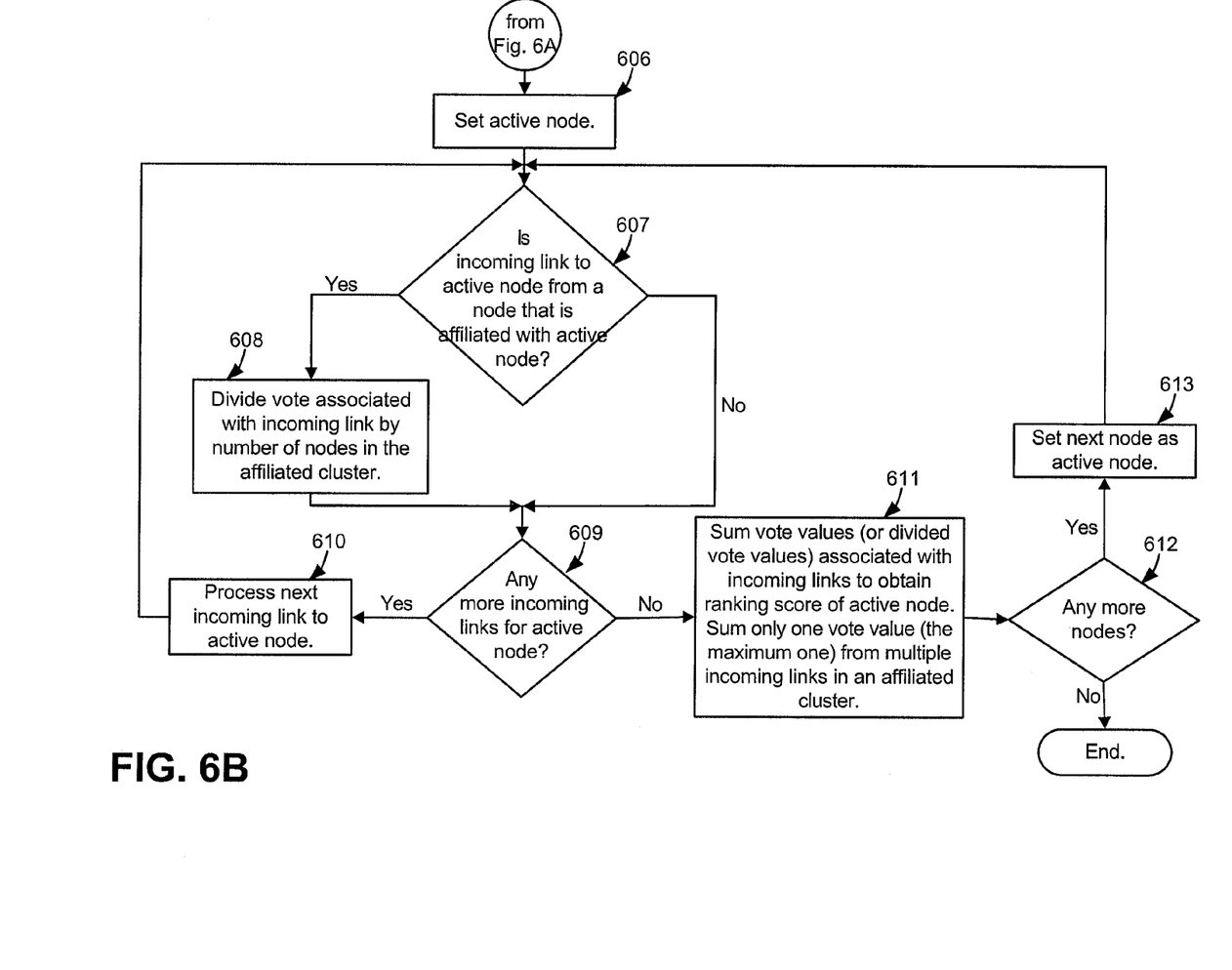

FIGS. 6A and 6B are flow charts illustrating the calculation of the ranks according to one embodiment of the invention, performed in act 503, in additional detail. Ranking component 340 may begin by assigning the seed nodes a rank equal to the authority threshold and all other nodes a rank of zero (act 601).

For each node in set 400 with a non-zero rank, ranking component 340, in acts 602-605, calculates the vote value the node contributes to the nodes to which it has an outbound link. In acts 606-612, ranking component 340 determines the new ranks for each of the nodes in set 400 based on the determined vote values.

In act 602, the nodes initial vote value is calculated as the maximum of: (1) the rank of the node divided by the number of outbound links from the node and multiplied by the damping factor, and (2) the rank of the node divided by the trusted authority threshold, raised to the power of the authority decay exponent, and multiplied by the full vote value. Value (2) is a vote value based on a full vote but that falls off from a full vote exponentially as the node is less like a trusted authority node. Stated more formally, the initial vote value is calculated as $$\text{Max}\left(\frac{\text{Rank}}{O} \cdot D, \left(\frac{\text{Rank}}{A}\right)^E \cdot F\right), \quad \text{(Eq. 1)}$$

where A is the authority threshold, E is the authority decay exponent, O is the number of outbound links from a node, F is the value of a full vote, and D is the damping factor.

If the initial vote value calculated in act 602 (equation 1) is greater than the full vote value (e.g., 1.0), ranking component 340 substitutes the full vote value for the initially calculated value (acts 603 and 604). Acts 602-604 are more formally defined with following equation:

$$\text{Min}\left(\text{Max}\left(\left(\frac{\text{Rank}}{A}\right)^E \cdot F, \frac{\text{Rank}}{O} \cdot D\right), F\right). \quad \text{(Eq. 2)}$$

By dividing the rank of nodes that are not near the authority threshold by the number of outbound links, Acts 602-604 operate to dilute the vote value of these nodes. See, for example, the PageRank™ method previously described. The vote value of nodes near the authority threshold, however, is not diluted by the number of outbound links O from the node. Ranking component 340 may repeat acts 601-604 for each node in set 400, (act 605), to thereby determine the vote value associated with each node. It will be understood by those of ordinary skill that Equation 1 and Equation 2 are provided merely as one example of a method to dilute the vote value of nodes. Numerous other functions may be employed to adjust the vote value of nodes, such as based on the number of outbound links, consistent with principles of the present invention. For example, many functions may be conceived in which the adjustment is stronger when nodes have ranking values farther from the authority threshold and in which the adjustment is weaker when nodes are ranked nearer to the authority threshold.

With the vote values calculated in acts 601-605, ranking component 340 may next determine the new rank for each of the nodes. Ranking component 340 may begin to iterate through all of the nodes in set 400 by setting a first node as an active node (act 606) (FIG. 6B). The active node is the node for which the rank is calculated. Ranking component 340 may then determine if an inbound link to the active node is from a node that is in an affiliated cluster with the active node (act 607). If so, the vote associated with the inbound link may be adjusted; for example, ranking component 340 may calculate the vote value of the inbound link as the vote value of the node that originates the inbound link (as determined in acts 601-605) adjusted by the number of nodes in the affiliated cluster (act 608). In one implementation, the adjustment can be performed by dividing the vote value by the number of nodes in the affiliated set. Otherwise, the vote value of the inbound link is simply assigned the vote value of the node that originates the inbound link.

As an example of acts 608 and 609, consider node 401 in affiliated cluster 410 (FIG. 4). Node 401 has three inbound links, associated with nodes 402, 403, and 406. Assume that the vote value of each of nodes 402, 403, and 406 was determined to be a full vote value of 1.0 (i.e., each of these nodes is a trusted authority). In this case, node 401 would receive a vote of 1.0 from node 406 and a vote of 0.333 (the vote value of 1.0 divided by the three nodes in cluster 410) from nodes 402 and 403. In this manner, the votes from affiliated nodes 402 and 403 are deemphasized. Deemphasizing votes from nodes that are affiliated, and thus assumed to be under control of the same entity, can be advantageous as it could otherwise be very easy for the controlling entity to intentionally create cross-site links to many or all of its nodes for the sole purpose of increasing its rank.

Ranking component 340 may repeat acts 608 and 609 for each incoming link to the active node (acts 609 and 610). Ranking component 340 may then sum the vote values for each of the inbound links to the active node to obtain the rank for the active node (act 611). The sum may be implemented such that, when summing the vote values, votes from affiliated nodes are adjusted to account for the affiliation of nodes. For example, each node may receive a maximum of one vote per affiliated cluster of nodes (act 611). If multiple nodes in an affiliated cluster link to a single node, only the maximum vote value for the linking affiliated node may be summed in act 611. To illustrate this concept, consider node 409 in FIG. 4 and assume that the vote of node 405 is greater than the vote of node 404. The rank may be computed as the sum of just node 405. In other possible implementations, instead of just taking the maximum vote value, other combination functions may be used. Acts 607-611 may be repeated for each node in set 400 (acts 612 and 613). In this manner, the rank for each node in the network may be calculated. As previously discussed with reference to FIG. 5, the rank calculated via the operations illustrated in FIG. 6 may then be repeated a number of times until the ranks stabilize over different iterations.

Exemplary Implementation

Figure 7:
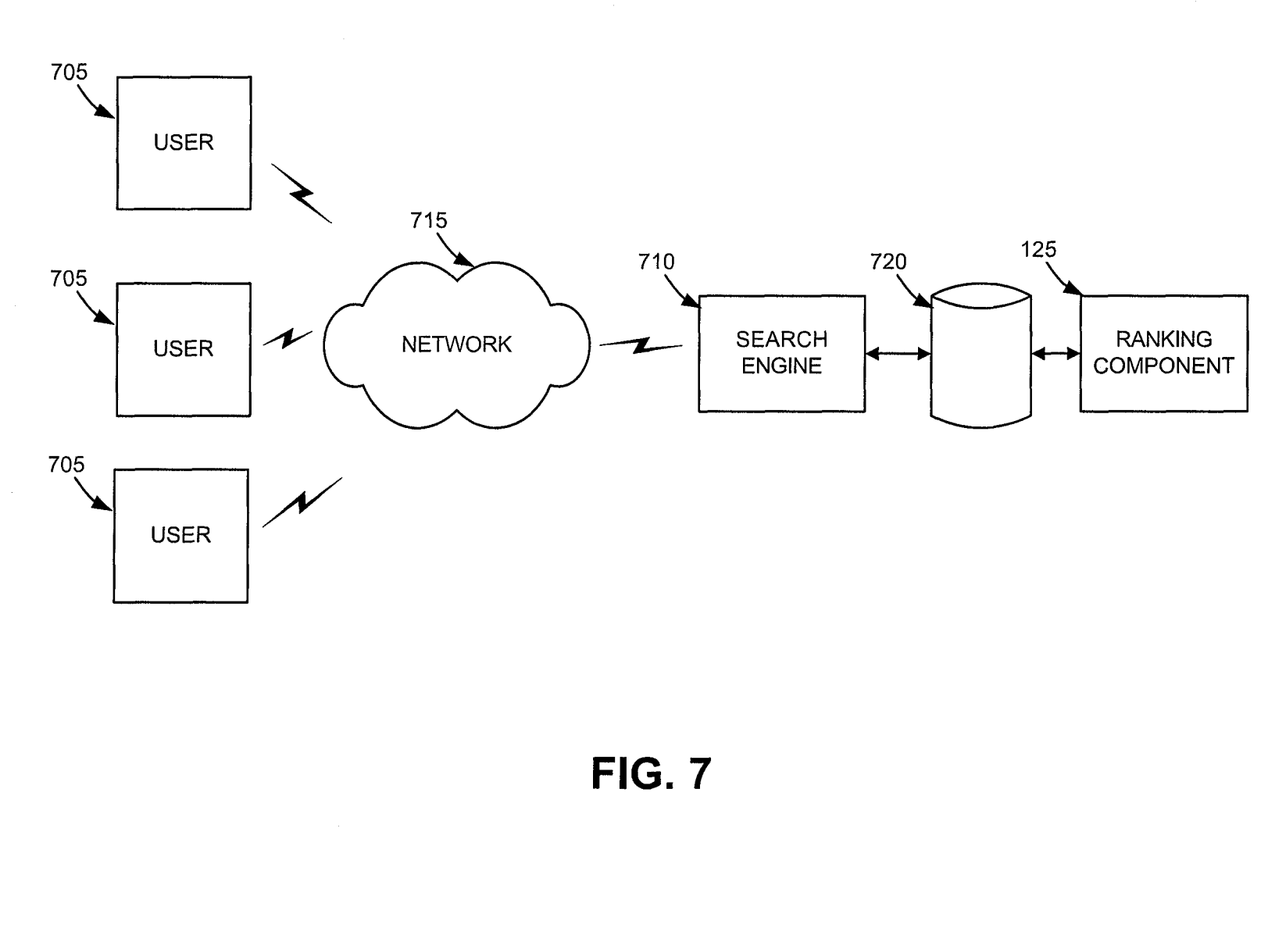
FIG. 7 is a diagram illustrating an exemplary implementation of the ranking component in the context of an Internet search engine.

FIG. 7 is a diagram illustrating an exemplary implementation of ranking engine 125 implemented in the context of an Internet search engine. A number of users 705 may connect to a search engine 710 over a network 715, such as the Internet. Search engine 710 may be a traditional search engine that returns a ranked set of documents related to a user query. Search engine 710 may be a general search engine, such as one based on all documents from a large collection, such as documents on the web, or a more specialized search engine, such as a news search engine. In other implementations, search engine 710 may be implemented over a specialized corpus of documents, such as a corporate document database made available over a corporate network 715.

In operation, search engine 710 may receive a user query and generate a list of documents that contain the terms of the user query. Search engine 710 may sort the documents in the list based on a number of factors, including the rank values computed for each of the documents in the list. The rank values may be generated by ranking engine 125 using the above-described techniques. In one implementation, the rank values may be generated ahead of time and stored in database 720. Search engine 710 may then simply look-up the rank of any particular document in database 720.

In addition to using the rank values when returning documents to users, search engine 710 may use the rank values when determining which documents to index, as one of many possible variables describing the quality of a document, and as one of many possible variables describing the trustworthiness of a link.

CONCLUSION

Techniques for assigning rankings to nodes in a linked database were described. The calculated ranks reflect a number of desirable properties when ranking nodes based on node quality. Multiple links from affiliated nodes are deemphasized, thus reducing the possible effect on the rank by a single entity, such as a commercial "link farm" attempting to artificially boost the rank of certain nodes. Additionally, because the maximum vote amount that a single node can contribute is capped to a full vote value, "super nodes" that receive an extremely high number of inbound links, and thus would otherwise have an extremely high rank, are restricted from having undue influence on the ranks of the nodes to which it links. Further, because authority nodes contribute a set vote amount regardless of the number of nodes linked to, nodes are discouraged from hoarding rank by only linking to a few sites.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders to still achieve the same or equivalent results. Additionally, although primarily described in the context of web sites on the Internet, the concepts discussed above could be applied to other entities that can be modeled as a linked graph of homogeneous nodes. Examples may include reference papers that cite other reference papers, vendor/customer relationships among companies, social networks, etc.

No element, act, or instruction used in the description of the present application should be construed as critical or essential to the invention unless explicitly described as such. Also, as used herein, the article "a" is intended to include one or more items. Where only one item is intended, the term "one" or similar language is used.

What is claimed:

1. A system comprising:
one or more computers configured to:
identify a plurality of nodes,
each node, of the plurality of nodes, representing a respective document, and
the plurality of nodes including one or more linking nodes,
each linking node including a link to a respective node in the plurality of nodes;
generate one or more clusters of affiliated nodes from the plurality of nodes,
where the affiliated nodes, of each cluster of affiliated nodes, are one or more of:
owned by a common entity, or
controlled by the common entity;
determine a vote value for a link from a linking node, of the one or more linking nodes, to a particular node in the plurality of nodes,
where the vote value is determined based on whether the linking node and the particular node are in a same cluster of affiliated nodes;
adjust the determined vote value, when the linking node and the particular node are in the same cluster, to determine an adjusted vote value,
where the adjusted vote value is determined by dividing the determined vote value by a quantity of nodes in the same cluster; and
determine a ranking value for the particular node based on the adjusted vote value for the link.

2. The system of claim 1, where, when generating the one or more clusters, the one or more computers are configured to:
determine that two or more nodes, in the plurality of nodes, are one or more of: owned by the common entity, or controlled by the common entity based on a probability that the two or more nodes are controlled by a single entity.

3. The system of claim 1, where the vote value for the link from the linking node is further determined based on an initial rank of the linking node.

4. The system of claim 1, where, when determining the ranking value for the particular node, the one or more computers are configured to:
combine the vote values of each link from a particular linking node, of the plurality of linking nodes, to the particular node.

5. The system of claim 1, where, when determining the ranking value for particular node, the one or more computers are configured to:
determine that multiple nodes, in a particular cluster of affiliated nodes, comprise links to the particular node; and
use a maximum vote value of vote values of the links to the particular node from the multiple nodes, in the particular cluster of affiliated nodes, to determine the ranking value, and not use any other vote values of the links to the particular node from the multiple nodes, in the particular cluster of affiliated nodes, to determine the ranking value.

6. The system of claim 1, where the one or more computers are further configured to:
use the ranking value to determine a set of documents, that each corresponds to at least one of the plurality of nodes, to present based on a search query.

7. The system of claim 1, where the one or more computers are further configured to:
use the ranking values to determine whether to index each of a plurality of documents that each corresponds to at least one of the nodes in the plurality of nodes.

8. The system of claim 1, where each node represents a webpage.

9. The system of claim 1, where each node represents a website, and
where the one or more computers are further configured to:
obtain ownership information for each website represented by each node, of the plurality of nodes, and
determine that one or more websites are at least one of owned by the common entity or controlled by the common entity based on the obtained ownership information.

10. The system of claim 1, where each node represents a group of documents written by a particular author, and
where the one or more computers are further configured to:
determine that one or more groups of documents are at least one of owned by the common entity or controlled by the common entity based on a similarity of content between the one or more groups of documents.

11. A method comprising:
identifying, by one or more server devices, a plurality of nodes,
each node, of the plurality of nodes, representing a respective document, and
the plurality of nodes including one or more linking nodes,
where each linking node has a link to a node in the plurality of nodes;
generating, by the one or more server devices, one or more clusters of affiliated nodes from the plurality of nodes,
where the affiliated nodes, of each cluster of the one or more clusters of affiliated nodes, are commonly owned or controlled;
determining, by the one or more server devices, a vote value for a link from a linking node, of the one or more linking nodes, to a particular node in the plurality of nodes,
where the vote value is determined based on whether the linking node and the particular node are in a same cluster of affiliated nodes;
adjusting, by the one or more server devices, the determined vote value, when the linking node and the particular node are in the same cluster, to determine an adjusted vote value,
where the adjusted vote value is determined by dividing the determined vote value by a quantity of nodes in the same cluster; and
determining, by the one or more server devices, a ranking value for the particular node based on the adjusted vote value for the link.

12. The method of claim 11, where generating the one or more clusters of affiliated nodes includes:
determining that two or more nodes, in the plurality of nodes, are commonly owned or controlled based on a probability that the two or more nodes are controlled by a single entity.

13. The method of claim 11, where the vote value for each link from the linking node is further determined based on an initial rank of the linking node.

14. The method of claim 11, where determining the ranking value for particular node, the method comprises:
combining the vote values of each link from a particular linking node to the particular node.

15. The method of claim 11, where determining the ranking value for the particular node, the method comprises:
determining that multiple nodes in a particular cluster of affiliated nodes have links to the particular node; and
using a maximum vote value of vote values of the links to the particular node from the multiple nodes, in the particular cluster of affiliated nodes, to determine the ranking value, and not using any other vote values of the links to the particular node from the multiple nodes, in the particular cluster of affiliated nodes, to determine the ranking value.

16. The method of claim 11, further comprising:
using the ranking value to determine a set of documents that each corresponds to at least one of the nodes in the plurality of nodes, to present based on a search query.

17. The method of claim 11, further comprising:
using the ranking values to determine whether to index each of a plurality of documents that each corresponds to at least one of the nodes in the plurality of nodes.

18. The method of claim 11, where each node represents a webpage.

19. The method of claim 11, where each node represents a website.

20. The method of claim 11, where each node represents a group of documents written by a particular author.

21. A device comprising:
a memory to store instructions; and
a processor to execute the instructions to:
identify a plurality of nodes,
each node, of the plurality of nodes, representing a respective document, and
the plurality of nodes including one or more linking nodes,
each linking node including a link to a respective node in the plurality of nodes;
generate one or more clusters of affiliated nodes from the plurality of nodes,
where the affiliated nodes, of each cluster of affiliated nodes, are one or more of:
owned by a common entity, or
controlled by the common entity;
determine a vote value for a link from a linking node, of the one or more linking nodes, to a particular node in the plurality of nodes,
where the vote value is determined based on whether the linking node and the particular node are in a same cluster of affiliated nodes; adjust the determined vote value, when the linking node and the particular node are in the same cluster, to determine an adjusted vote value,
where the adjusted vote value is determined by dividing the determined vote value by a quantity of nodes in the same cluster; and
determine a ranking value for the particular node based on the adjusted vote value for the link.

22. The device of claim 21, where the processor is further configured to:
use the ranking value to determine a set of documents, that each corresponds to at least one of the plurality of nodes, to present based on a search query.

23. The device of claim 21, where each node represents a website, and where the processor is further configured to:
obtain ownership information for each website represented by each node, of the plurality of nodes; and
determine that one or more websites are at least one of owned by the common entity or controlled by the common entity based on the obtained ownership information.

24. The device of claim 21, where the processor is further configured to:
use the ranking values to determine whether to index each of a plurality of documents that each corresponds to at least one of the nodes in the plurality of nodes.

* * * * *